United States Patent
Akao

[11] Patent Number: 5,808,650
[45] Date of Patent: Sep. 15, 1998

[54] IMAGE FORMING APPARATUS WITH LIGHT EMITTING ELEMENT HEAD

[75] Inventor: Masahide Akao, Gifu-ken, Japan

[73] Assignee: Sanyo Electric Co., Ltd., Moriguchi, Japan

[21] Appl. No.: 690,034

[22] Filed: Jul. 31, 1996

[30] Foreign Application Priority Data

Feb. 8, 1996 [JP] Japan ................................. 7-197216

[51] Int. Cl.⁶ .................................................. G01D 15/14
[52] U.S. Cl. ........................... 347/130; 347/238; 399/220
[58] Field of Search .................... 399/220, 4; 355/70; 347/130, 131, 238

[56] References Cited

U.S. PATENT DOCUMENTS

| | | |
|---|---|---|
| 4,090,206 | 5/1978 | Pfeifer et al. . |
| 4,427,275 | 1/1984 | Stalzer . |
| 4,475,115 | 10/1984 | Garbe et al. . |
| 4,566,015 | 1/1986 | MacKenzie . |
| 4,743,927 | 5/1988 | Sasaki . |
| 5,515,097 | 5/1996 | Munechika et al. . |

FOREIGN PATENT DOCUMENTS

| | | |
|---|---|---|
| 57-152273 | 9/1982 | Japan . |
| 57-174281 | 10/1982 | Japan . |
| 58-65682 | 4/1983 | Japan . |
| 61-185759 | 8/1986 | Japan . |
| 3-165172 | 7/1991 | Japan . |

*Primary Examiner*—Robert Beatty
*Attorney, Agent, or Firm*—Darby & Darby

[57] ABSTRACT

An image forming apparatus includes an LED array head to which a vibration applying unit driven by a driver is attached. The LED array head is shifted by a predetermined amount in a direction at an angle θ relative to the axis of a photosensitive drum. LEDs are driven to emit the light in accordance with video data before and after the shift, and an electrostatic latent image according to the video data is formed on the photosensitive drum. Since the LED array head is shifted in a diagonal direction relative to the axis of the photosensitive drum, it is possible to form high-resolution dot lines in the axial direction even if the photosensitive drum is rotated at a constant speed.

8 Claims, 6 Drawing Sheets

F I G. 8
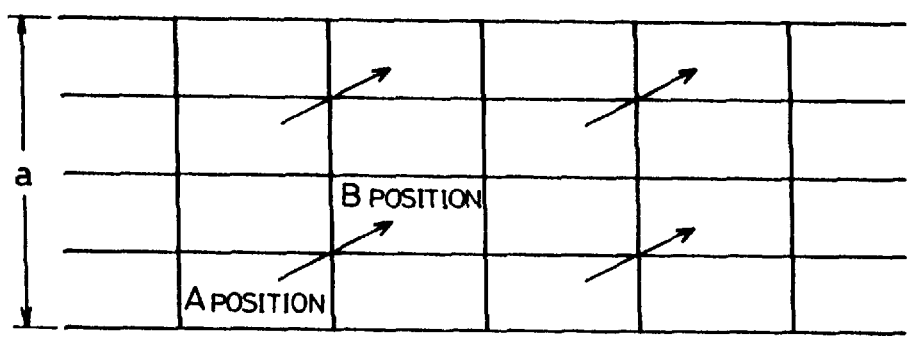

IMAGE FORMING APPARATUS WITH LIGHT EMITTING ELEMENT HEAD

BACKGROUND OF THE INVENTION

1. Field of the Invention

The present invention relates to an image forming apparatus. More specifically, the present invention relates to an image forming apparatus in which an image of video data can be formed on a photosensitive drum by means of a light emitting element head.

2. Description of the Prior Art

Some examples of conventional such a kind of image forming apparatus are disclosed in, for example, (1) Japanese Patent Application Laying-Open No. 57-152273 laid-open on Sep. 20, 1982, (2) Japanese Patent Application Laying-Open No. 57-174281 laid-open on Oct. 26, 1982 and (3) Japanese Patent Application Laying-Open No. 58-65682 laid-open on Apr. 19, 1983. This prior art is directed to an apparatus in which a resolution of an image is increased by vibrating a light emitting element head in an axial direction of a photosensitive drum and driving the light emitting element head at a time that an amplitude of the vibration becomes maximum.

There are problems to be solved in the prior art. More specifically, since the photosensitive drum is rotated at a constant speed in the prior art (1) and (2), dot lines are formed with being deviated according to a time between a preceding light emission and a succeeding light emission. Such a problem does not occur in the prior art (3) because the photosensitive drum is stopped in driving while the light emitting element head is operated; however, image forming speed becomes slow.

SUMMARY OF THE INVENTION

Therefore, a principal object of the present invention is to provide a novel image forming apparatus.

Another object of the present invention is to provide an image forming apparatus capable of forming high-resolution dot straight lines in the axial direction of the photosensitive drum with no deviation while the image forming speed is not made slowed.

According to the present invention, an image forming apparatus for forming an image of video data onto a photosensitive drum by a light emitting head, comprises: shifting means for shifting the light emitting element head in a diagonal direction relative to the axial direction of the photosensitive drum, and driving means for driving the light emitting element head in accordance with the video data before and after the light emitting element head is shifted.

A piezoelectric element to which voltage is applied in a predetermined cycle is attached to the light emitting element head, whereby the light emitting element head is shifted in a direction of an angle θ relative to the axial direction of a photosensitive drum by a predetermined amount, for example. Before and after the shift, the light emitting element head is driven to emit a light image in accordance with the video data, and therefore, an image of the video data is formed on the photosensitive drum.

According to the present invention, since the light emitting element head is shifted in the diagonal direction relative to the axial direction of the photosensitive drum by the shifting means, and the light emitting element head emits the light image before and after the shift, it is possible to form high-resolution dot lines in the axial direction of the photosensitive drum with no deviation while the photosensitive drum is not stopped and rotated at a constant speed.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an illustrative view showing a portion of an operation of another embodiment.

DETAILED DESCRIPTION OF THE PREFERRED EMBODIMENTS

Figure 1:
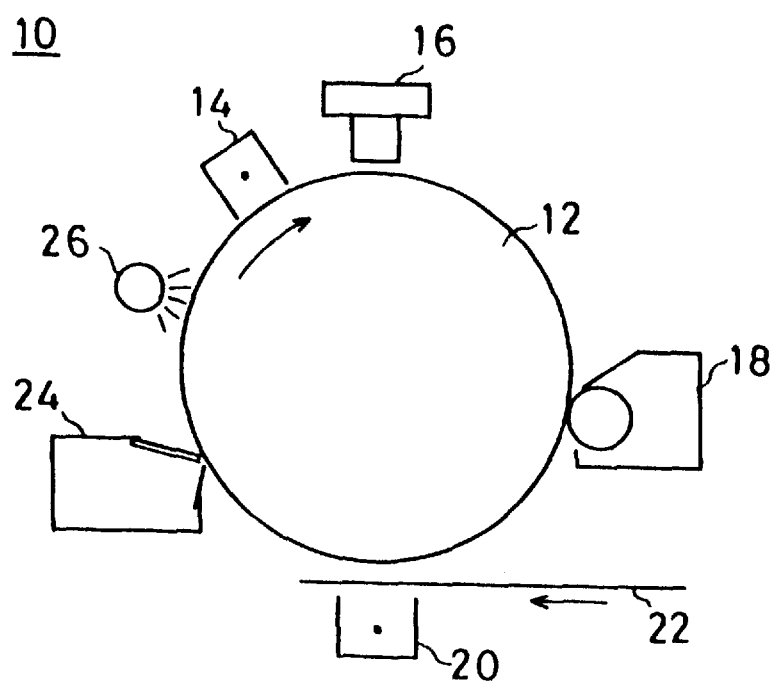
FIG. 1 is an illustrative view showing one embodiment in accordance with the present invention.

A printer 10 of the embodiment shown in FIG. 1 includes a photosensitive drum 12 which rotates in the direction shown by the arrow mark. A peripheral surface of the photo-sensitive drum 12 is charged by a charger 14. Thereafter, a light image according to video data is irradiated onto the surface by an LED array head 16 provided above the photosensitive drum 12, whereby an electrostatic latent image is formed on the surface. The electrostatic latent image is developed by supplying a toner onto the surface by a developer 18, and a toner image is transferred onto a paper 22 by a transferor 20. Excess toner is restored by a cleaner 24, and a remaining charge on the surface of the photosensitive drum 12 is erased by an erasure lamp 26. In the embodiment of the invention being described, the print speed and a rotation speed of the photosensitive drum 12 are 8 ppm (prints per minute) and 50 mm/s, respectively.

Figure 2:
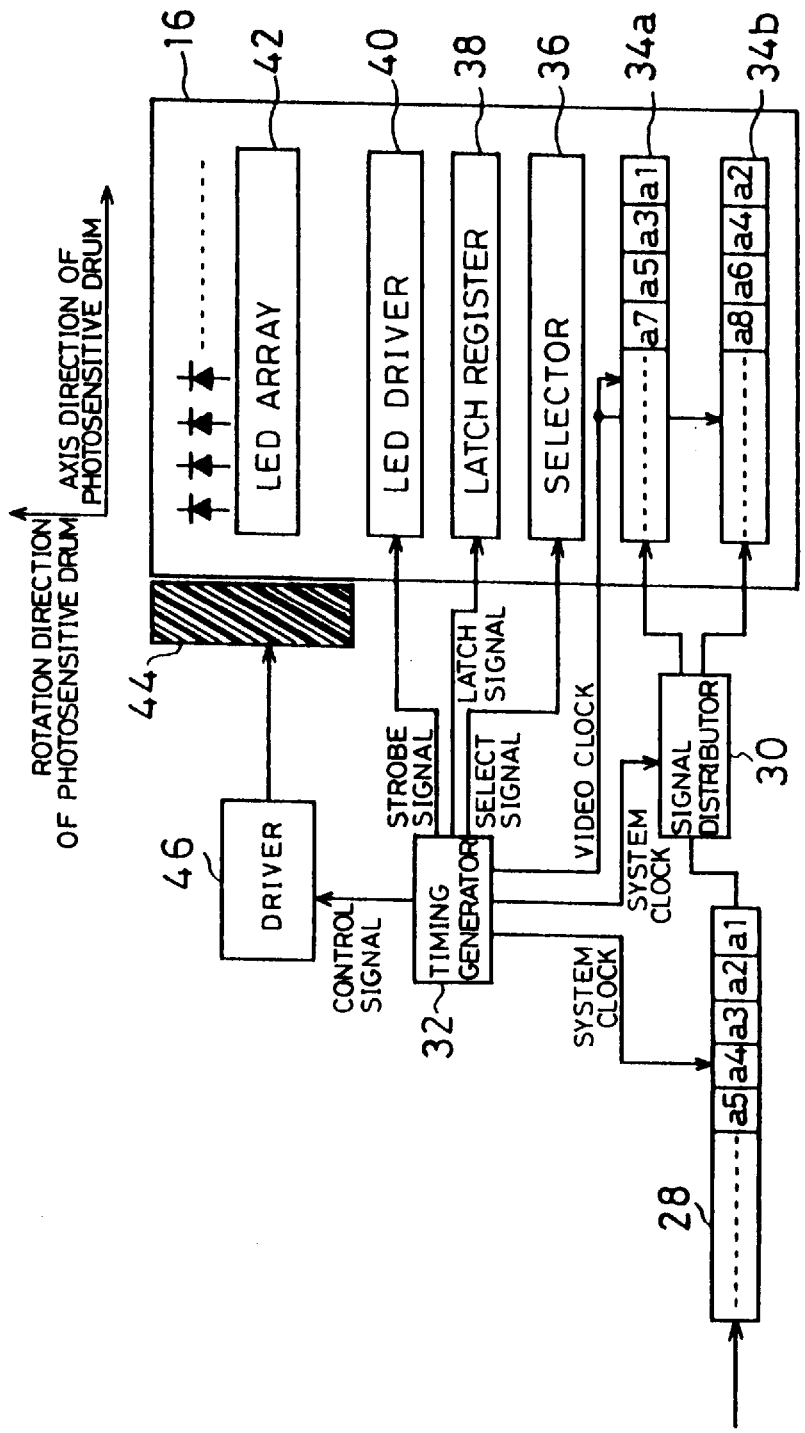
FIG. 2 is a block diagram showing a portion of FIG. 1 embodiment.

The LED array head 16 receives the video data as shown in FIG. 2, and outputs a light image signal according thereto. More specifically, the video data is written into a buffer memory 28 in response to a system clock outputted from a timing generator 32 in accordance with the timing shown in FIG. 3(C), and then, read-out. The buffer memory 28 is constituted by a shift register of 5000 bits, and a frequency of the system clock is 8.3 MHz. Accordingly, video data of 5000 bits (5000 dots) is written into the buffer memory 28 at once, and it takes 600 microseconds for writing or reading of the video data. The video data read-out from the buffer memory 28 is distributed serially, one by one bit, by a flip-flop circuit (not shown) included in a signal distributor 30 in accordance with another system clock outputted from the timing generator 32 at a timing as shown in FIG. 3(D).

Accordingly, respective odd number bit data a1, a3, a5, a7, . . . and even number bit data a2, a4, a6, a8, . . . are respectively stored into shift registers 34a and 34b, each being of 2500 bits, in response to a video clock which is outputted from the timing as generator 32 at a timing shown in FIG. 3(E) and has a frequency of 4.2 MHz. The odd number bit data and the even number bit data are applied to the selector 36, and either one of the data is selected in accordance with a select signal outputted from the timing generator 32. More specifically, the select signal is changed at a timing shown in FIG. 3(F), and the odd number bit data is selected during a high-level of the select signal, and the even number bit data is selected during a low-level. The odd number bit data or the even number bit data as selected is latched by a latch register 38 in response to a latch signal outputted from the timing generator 32 and shown in FIG. 3(D).

In addition, in FIGS. 3(C), (D) and (E), the system clocks and the video clock maintain the high-levels; however, the levels of such the clocks are actually changed during the high-levels in accordance with their frequencies.

An LED driver 40 receives a strobe signal outputted at a timing as shown in FIG. 3(H), and drives some LEDs included in an LED array 42 in accordance with the latch data. Therefore, the LEDs emit to form a light image while a pulse shown in FIG. 3(I) is at the high-level.

A vibration applying unit 44 is attached to the LED array head 16, and vibrates in accordance with a drive signal outputted from a driver 46 and shown in FIG. 3(A). Therefore, the LED array head 16 is shifted between an A position and a B position as shown in FIG. 3(B) with taking 50 microseconds. In addition, the driver 46 outputs the drive signal in response to a control signal from the timing generator 32.

As described above, the shift registers 34a and 34b store the odd number bit data and the even number bit data distributed by the signal distributor 30, respectively. Then, the latch register 38 latches the odd number bit data at a time that the drive signal is in the low-level, and the LED driver 40 drives LEDs according to the odd number bit data in response to the strobe signal. Furthermore, the latch register 38 latches the even number bit data at a time that the drive signal is in a high-level, and the LED driver 40 drives the LEDs according to the even number bit data in response to the strobe signal. That is, the LED array 42 outputs a light image signal corresponding to the even number bit data at the A position before the LED array head 16 is shifted, and outputs a light image signal corresponding to the even number bit data at the B position after the LED array head 16 is shifted. Therefore, the resolution of dot lines is improved twice.

Figure 4:
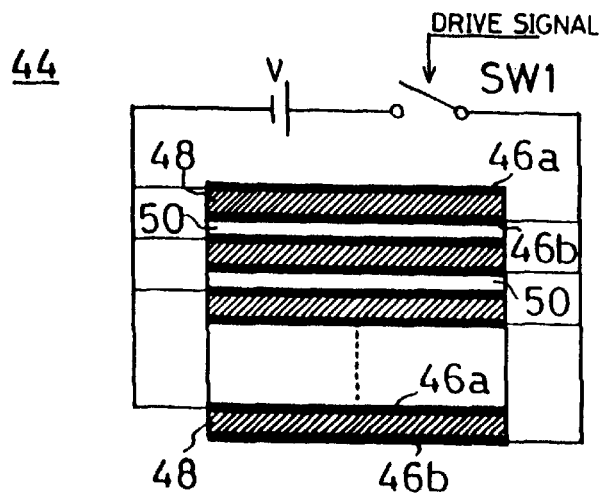
FIG. 4 is an illustrative view showing a portion of FIG. 1 embodiment.
Figure 5:
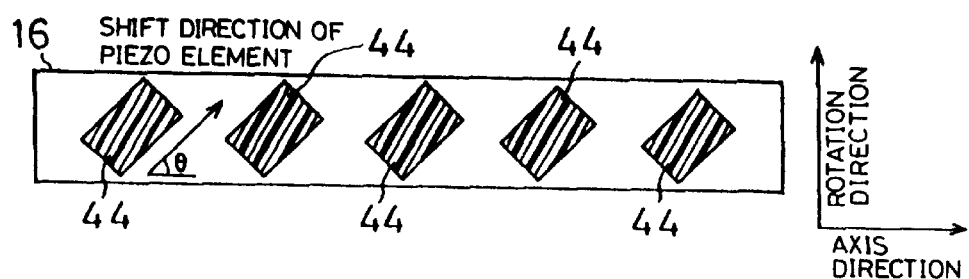
FIG. 5 is an illustrative view showing another portion of FIG. 1 embodiment.

The vibration applying unit 44 is constituted as shown in FIG. 4. More specifically, a piezoelectric element 48 is sandwiched by electrodes 46a and 46b, and a plurality of such elements 48 are stacked, and insulating members 50 are inserted between adjacent electrodes 46a and 46b. A DC voltage source V is connected between the respective electrodes 46a and 46b, and a switch SW1 turned-on or -off by the drive signal is inserted between the respective electrodes and the direct voltage source V. Since the piezo elements 48 are stacked as described above, it is possible to make the vibration width (the shift amount) of the vibration applying unit 44 large. A plurality of the vibration applying units 44 are attached to a surface of the LED array head 16 as shown in FIG. 5. In addition, the vibration applying units 44 are arranged such that a shift direction of each of the piezo elements 48 has an angle θ relative to the axis of the photosensitive drum 12 when the switch SW1 is turned on.

Figure 6:
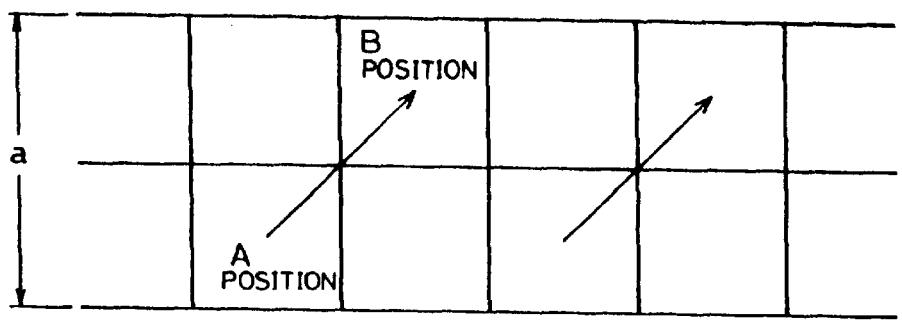
FIG. 6 is an illustrative view showing a portion of an operation of FIG. 1 embodiment.

Specific values of the shift amount and the angle θ of the vibration applying unit 44 are determined as follows:

Referring to FIG. 6, assuming that a single dot pitch of the LED array head 16 is defined as "a", for realizing double resolution in a main scanning direction (the axial direction) and single resolution in a subscanning direction (the rotation direction) of the LED array head 16, it is needed to shift the LED array head 16 in both the rotation direction and the axial direction of the photosensitive drum 12 for "a/2" micrometers. Accordingly, the shift amount can be evaluated according to the following equation (1), and the angle θ is 45°.

$$\sqrt{\left[\frac{a}{2}\right]^2 + \left[\frac{a}{2}\right]^2} = \frac{\sqrt{2}}{2} a \tag{1}$$

Therefore, in a case where the rotation speed of the photosensitive drum 12 is 50 mm/s and the resolution of the LED array head 16 is 300 dpi, for realizing the resolution of 600 dpi by vibrating the LED array head 16, the shift amount must be 60 micrometers and the angle θ must be 45°.

Figure 3:
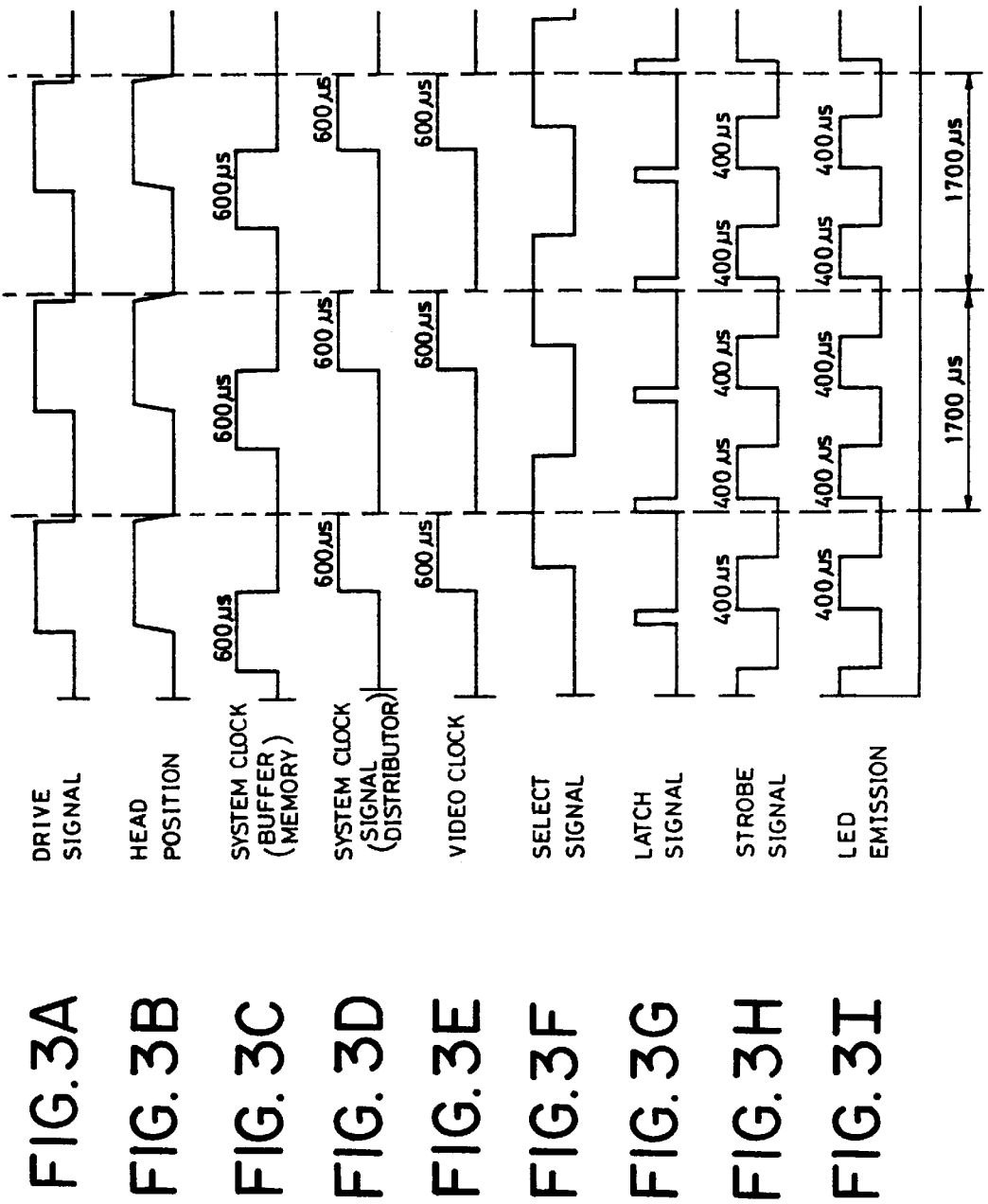
FIG. 3(A) is a waveform chart showing a drive signal.
FIG. 3(B) is a waveform chart showing a head position.
FIG. 3(C) and FIG. 3(D) are waveform charts showing system clocks.
FIG. 3(E) is a waveform chart showing a video clock.
FIG. 3(F) is a waveform chart showing a select signal.
FIG. 3(G) is a waveform chart showing a latch signal.
FIG. 3(H) is a waveform chart showing a strobe signal.
FIG. 3(I) is a waveform chart showing a light emission state of an LED.
Figure 7:
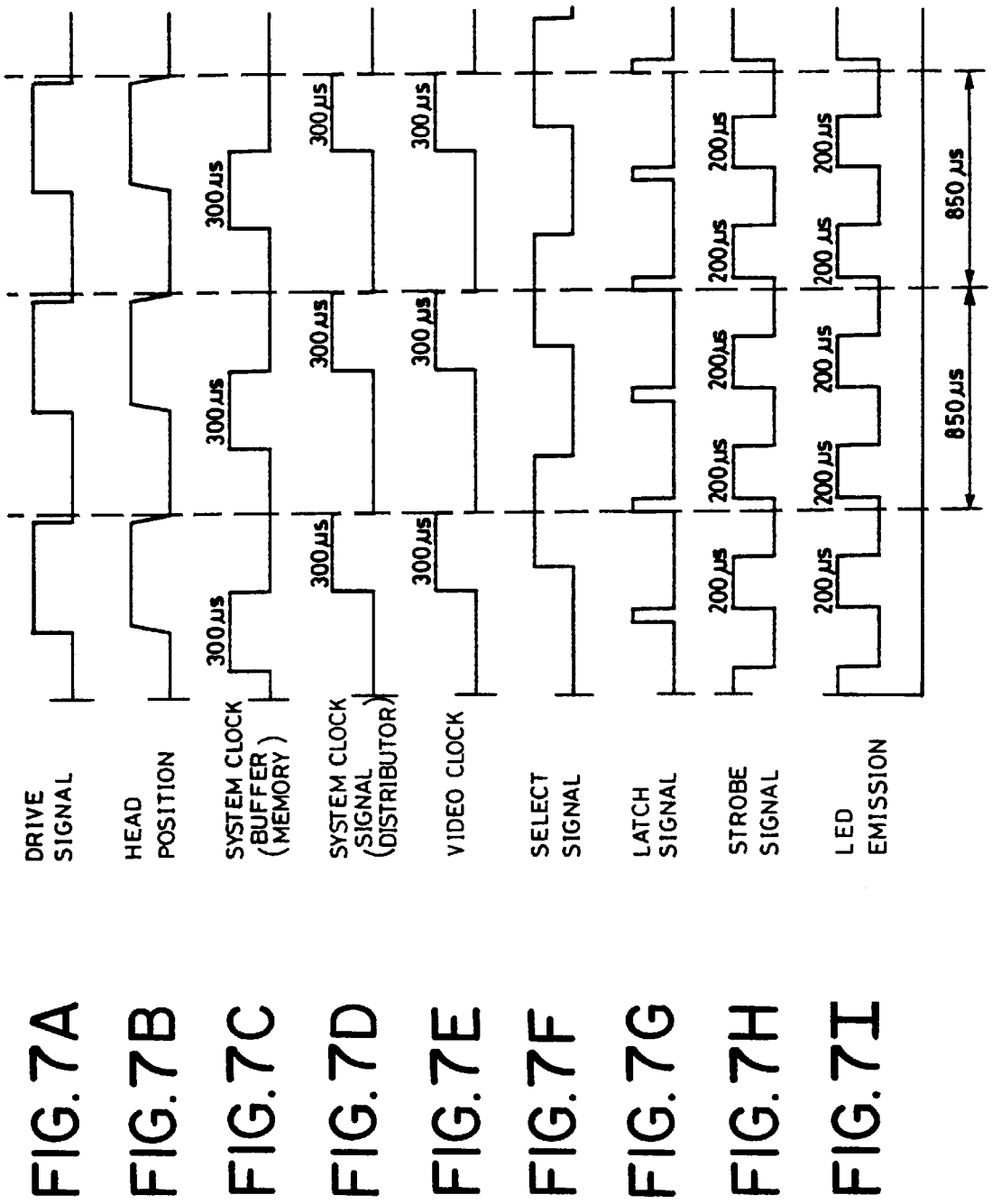
FIG. 7(A) is a waveform chart showing a drive signal.
FIG. 7(B) is a waveform chart showing a head position.
FIG. 7(C) and FIG. 7(D) are waveform charts showing system clocks.
FIG. 7(E) is a waveform chart showing a video clock.
FIG. 7(F) is a waveform chart showing a select signal.
FIG. 7(G) is a waveform chart showing a latch signal.
FIG. 7(H) is a waveform chart showing a strobe signal.
FIG. 7(I) is a waveform chart showing a light emission state of an LED.

Furthermore, for realizing the double resolution of the LED array head 16 in both the main scanning direction and the subscanning direction, in a case where the single dot pitch of the LED array head 16 is "a", it is necessary to set frequencies of the system clocks and the video clock at 16.7 MHz and 8.3 MHz, respectively, and cyclic periods of various kinds of signals outputted from the timing generator 32 into ½ in comparison with the timing of FIG. 3, as shown in FIG. 7. Furthermore, it is necessary to shift the LED array head 16 for "a/4" micrometers in the rotation direction and "a/2" micrometers in the axial direction as shown in FIG. 8. Accordingly, the shift amount is evaluated by the following equation (2), and the angle θ is 26.6°.

$$\sqrt{\left[\frac{a}{4}\right]^2 + \left[\frac{a}{2}\right]^2} = \frac{\sqrt{5}}{4} a \tag{2}$$

Therefore, in a case where the rotation speed of the photosensitive drum 12 is 50 mm/s and the resolution of the LED array head 16 is 300 dpi, for realizing a resolution of 600 dpi in both the main scanning direction and the subscanning direction, the shift amount must be 48 micrometers and the angle θ must be 26.6°.

According to the above described embodiment, since the LED array head 16 is shifted in a diagonal direction against the axis direction of the photosensitive drum 12, and the LED array head 16 is driven at both timings before and after the shift, it is possible to form high-resolution dot straight lines in the axial direction without changing the rotation speed.

In addition, it is clearly understood that the present invention can be applied to an image forming apparatus in which a photosensitive drum is exposed by an optical head in which a plurality of light emitting elements are arranged on an array.

Furthermore, though this embodiment was described with utilizing the vibration applying unit in which the plurality of piezo elements are stacked, if the shift amount is small, only one piezo element need be utilized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus for forming an image of video data on a photosensitive drum rotating at a constant speed by driving a light emitting element head, comprising:

shifting means for shifting said light emitting element head in a diagonal direction at an angle of 45° relative to the axis of said rotating photosensitive drum, and driving means for driving said light emitting element head in accordance with the video data before and after said light emitting element head is shifted to double the resolution of the image in the direction of the drum axis.

2. An image forming apparatus according to claim 1, wherein said shifting means includes a vibration applying unit attached to said light emitting element head that applies a vibration to said light emitting element head to move said head in a predetermined direction.

3. An image forming apparatus according to claim 2, wherein said vibration applying unit includes a piezoelectric element having a predetermined shift amount in a direction at an angle of 45° relative to said drum axis.

4. An image forming apparatus according to claim 3, wherein said predetermined shift amount is determined on the basis of a single dot pitch of said light emitting element head.

5. An image forming apparatus for forming an image of video data on a photosensitive drum rotating at a constant speed by driving a light emitting element head comprising:

shifting means for shifting said light emitting element head in a diagonal direction relative to the axis of said rotating photosensitive drum at an angle of 26.6°; and driving means for driving said light emitting element head in accordance with the video data before and after said light emitting element head is shifted to double the resolution of the image in both the direction of the drum axis and the direction of drum rotation.

6. An image forming apparatus according to claim 5, wherein said shifting means includes a vibration applying unit attached to said light emitting element head to apply a vibration to said light emitting element head to shift said head in a predetermined direction.

7. An image forming apparatus according to claim 6, wherein said vibration applying unit includes a piezoelectric element having a predetermined shift amount in a direction of an angle of 26.6° relative to the drum axis.

8. An image forming apparatus according to claim 6, wherein said predetermined shift amount is determined on the basis of a single dot pitch of said light emitting element head.

* * * * *

UNITED STATES PATENT AND TRADEMARK OFFICE
CERTIFICATE OF CORRECTION

PATENT NO. : 5,808,650
DATED : September 15, 1998
INVENTOR(S) : Masahide AKAO

It is certified that error appears in the above-identified patent and that said Letters Patent is hereby corrected as shown below:

On the title page, item [30]:

"Foreign Application Priority Data",
after [30], change "Feb. 8, 1996" to
-- Aug. 2, 1995 --

Signed and Sealed this

Twenty-second Day of June, 1999

Attest:

Q. TODD DICKINSON

*Attesting Officer*    Acting Commissioner of Patents and Trademarks